UNITED STATES PATENT OFFICE.

JAMES BOWKER, OF BALTIMORE, MARYLAND, ASSIGNOR TO BAIR, BROTHERS & CO., OF SAME PLACE.

IMPROVEMENT IN VARNISH FOR TINWARE.

Specification forming part of Letters Patent No. 103,291, dated May 24, 1870.

*To all whom it may concern:*

Be it known that I, JAMES BOWKER, of the city and county of Baltimore, and State of Maryland, have invented a new and Improved Varnish for Tinware, of which the following is a specification.

The improved varnish or lacquer which I have invented is designed for protecting oyster and fruit cans from rust from the action of sulphur in the atmosphere, at the same time adding to their appearance.

The ingredients of my varnish or lacquer are gum-dammar, gum-gamboge, benzine, and pyroxylic spirit, in about the following proportions: gum-dammar, one and a half pound; gum-gamboge, a half pound; pyroxylic spirit, one pint; benzine, one gallon. The pyroxylic spirit is used as a solvent of the coloring-matter of the gamboge, which solution is added to the varnish, previously prepared by dissolving the dammar in the benzine. Other coloring-matters may be used, if desired.

All varnishes or lacquers which have hitherto been prepared for this purpose have in course of time faded in color, and would not in damp conditions of the atmosphere dry clear and bright; but a varnish, such as above described will dry clear and bright in the dampest weather, is not brittle, and will not lose its color.

I do not confine myself to the exact proportions of the several ingredients above described; but

What I claim as my invention, and desire to secure by Letters Patent, is—

A varnish composed of gum-dammar, gamboge or other suitable coloring-matter, benzine, and pyroxylic spirit, substantially as set forth.

In testimony whereof I have signed my name to this specification before two subscribing witnesses.

JAMES BOWKER.

Witnesses:
A. POLLOK,
W. BAILEY.